US007683499B2

(12) United States Patent
Saucier

(10) Patent No.: US 7,683,499 B2
(45) Date of Patent: Mar. 23, 2010

(54) NATURAL GAS TURBINE GENERATOR

(75) Inventor: Neil C. Saucier, Prior Lake, MN (US)

(73) Assignee: S & W Holding, Inc., North Mankato, MN (US)

( * ) Notice: Subject to any disclaimer, the term of this patent is extended or adjusted under 35 U.S.C. 154(b) by 78 days.

(21) Appl. No.: 11/796,567

(22) Filed: Apr. 26, 2007

(65) Prior Publication Data

US 2008/0129051 A1 Jun. 5, 2008

Related U.S. Application Data

(60) Provisional application No. 60/795,743, filed on Apr. 27, 2006.

(51) Int. Cl.
*F02C 3/10* (2006.01)

(52) U.S. Cl. .......................................................... 290/52

(58) Field of Classification Search .................... 290/52
See application file for complete search history.

(56) References Cited

U.S. PATENT DOCUMENTS

| | | | | | |
|---|---|---|---|---|---|
| 2,984,751 | A | * | 5/1961 | Cliborn | 290/52 |
| 3,039,007 | A | * | 6/1962 | Williams et al. | 290/52 |
| 3,157,793 | A | * | 11/1964 | Adkins | 290/52 |
| 4,128,527 | A | * | 12/1978 | Kinjo et al. | 310/43 |
| 4,137,471 | A | * | 1/1979 | Sato et al. | 310/51 |
| 4,227,108 | A | * | 10/1980 | Washizu et al. | 310/214 |
| 4,232,991 | A | * | 11/1980 | Gamell | 415/90 |
| 4,293,777 | A | * | 10/1981 | Gamell | 290/52 |
| 4,347,034 | A | * | 8/1982 | Vigh | 415/92 |
| 4,387,311 | A | * | 6/1983 | Kobayashi et al. | 310/43 |
| 4,503,604 | A | * | 3/1985 | Rediger | 29/596 |
| 5,118,961 | A | | 6/1992 | Gamell | |
| 5,334,004 | A | | 8/1994 | Lefevre et al. | |
| 5,819,524 | A | * | 10/1998 | Bosley et al. | 60/39.465 |
| 6,798,111 | B1 | * | 9/2004 | Petersen | 310/254 |
| 6,946,758 | B2 | * | 9/2005 | Du et al. | 310/43 |
| 7,026,794 | B1 | | 4/2006 | French et al. | |
| 7,067,952 | B2 | * | 6/2006 | Neal | 310/259 |
| 7,218,009 | B2 | * | 5/2007 | Hendrickson et al. | 290/1 R |
| 7,574,867 | B2 | * | 8/2009 | Teets et al. | 60/792 |
| 2004/0007879 | A1 | | 1/2004 | Ruggieri et al. | |
| 2005/0217259 | A1 | | 10/2005 | Turchetta | |

* cited by examiner

*Primary Examiner*—Joseph Waks
(74) *Attorney, Agent, or Firm*—Patterson, Thuente, Skaar & Christensen, P.A.

(57) ABSTRACT

A turbine generator utilizing a passive high pressure fluid source such as a natural gas well head. The generator includes a core and lead wires encapsulated in a dielectric medium to isolate current-bearing components from the motivating fluid, thereby preventing carbon bridging and reducing the explosion hazard when the motivating fluid is a hydrocarbon. The turbine generator includes a rotor that utilizes the full length as an impingement surface for imparting momentum to the rotor, thereby maintaining a compact design that reduces the overall footprint of the turbine generator. Fluid exits the generator via horizontal passages that penetrate the lower extremities of the turbine generator, preventing the buildup of condensation in the unit.

7 Claims, 12 Drawing Sheets

(Fig.9b.)

NATURAL GAS TURBINE GENERATOR

RELATED APPLICATIONS

This application claims the benefit of U.S. Patent Application No. 60/795,743, filed 27 Apr. 2006, which is hereby incorporated by reference in its entirety.

FIELD OF THE INVENTION

The present invention relates to turbines and generators and, more particularly, to turbines with integrated generators.

BACKGROUND OF THE INVENTION

Turbine generators that exploit passive pressurized sources such as natural gas well heads have found utility in low power applications (100 watts or less). An example of such a generator is disclosed in U.S. Pat. No. 5,118,961 to Gamel and owned by S&W Holdings, Inc., the assignee of the present patent application. The reliability of these units has resulted in a wider variety of applications by relevant consumers, and attendant demands for higher power output.

A challenge with increased power output is the requirement for higher voltage levels. Devices that rely on the spatial separation of electrical connections to provide electrical isolation between the winding terminations may require a larger footprint to accomplish the required isolation. Units that service the petrochemical industry are often powered by high pressure hydrocarbon gases. Increased potential between electrical connections may result in arcing, creating an explosion hazard. Even where an explosion does not result, such arcing may lead to a build up of carbon deposits on the exposed connections that may eventually bridge between the connections, causing the unit to short out and incur structural damage.

One approach to increasing the power is to increase the size of the various components. Exemplary is U.S. Patent Application Publication No. 2005/0217259 by Turchetta, which discloses an in-line natural gas turbine that utilizes bevel gears to transmit the rotational power to a generator outside a pipeline. However, in spatially constrained areas (e.g. off shore drilling platforms), the footprint of such an approach may be prohibitive.

Increased power output generally requires a higher mass flow rate through a given unit, which leads to an increase in the amount of condensate that forms and accumulates in the unit. Existing units have been known to become flooded with accumulated condensation to the point of becoming inoperable.

Another issue in certain applications, independent of power level, is the effect of corrosive gases. Natural gas wells, for example, are known to contain hydrogen sulfide ($H_2S$), also referred to as "sour gas." The sour gas has a highly corrosive effect on metals commonly used in electric generators. Another common component indigenous to natural gas wells is water vapor, which is also corrosive and can cause operational problems when condensing out as a liquid.

Certain technologies utilize pressurized liquids to prevent hazardous gasses from entering unwanted portions of an assembly, such as disclosed in U.S. Pat. No. 5,334,004 to Lefevre et al. Where isolation from electrical machinery is desired, such an approach may require an isolation chamber distinct from the compartment housing the electrical machinery, as the use of liquids may be precluded for reasons of electrical isolation. The need for an isolation chamber will generally add to the required footprint of the generator.

What is needed is a gas turbine generator capable of utilizing a hydrocarbon medium without posing an explosion or carbon forming hazard, is resistive to the corrosive components that may be indigenous to the pressure source, and eliminates the potential of condensation flooding while maintaining a small footprint.

SUMMARY OF THE INVENTION

The various embodiments of the disclosed invention provide an arrangement that prevents arcing between adjacent lead connections, thereby minimizing the explosion hazard and eliminating carbon bridging between connections. Various units have also been made more compact relative to existing designs, to provide more electrical generation capacity within a smaller footprint. For example, the present disclosure may produce a natural gas turbine that produces 500 Watts while occupying only a 250-mm×250-mm plan view footprint. The problem of condensation buildup is also mitigated.

In one embodiment, the turbine generator has a core assembly that includes windings with terminations connected to lead wires. The core assembly is encapsulated in a dielectric potting or casting which hermetically seals the windings, the winding terminations, and at least a portion of the lead wires leading to the connection with the terminations. The lead wires, either individually or as a group, may also be contained within a dielectric shroud such as shrink fit tubing that terminates on one end within the dielectric casting and on the other end within a packing in a sealed container. By this approach, all current-bearing components are isolated from the flow stream. Certain embodiments of the invention have found favor in an industrial context, earning Factory Mutual (FM) approval for use with natural gas.

The turbine generator has a rotor that is motivated by a high pressure fluid such as natural gas that is directed tangentially to impinge on the outer perimeter of the rotor. A design is disclosed wherein the full axial length of the rotor is utilized as the impingement surface, thereby increasing the power imparted to the rotor over a minimum length, thereby maintaining a small overall footprint for the turbine generator.

The fluid enters the turbine generator via inlet passages and exits the unit via outlet passages. The outlet passages are configured to penetrate the interior of the turbine generator at a substantially horizontal angle and at the bottom of the cavities that house the components of the turbine generator, thus enabling the cavities to drain and reducing build up of condensation within the cavities.

In another embodiment, a natural gas turbine generator includes a housing that defines an interior chamber in fluid communication with an inlet and an outlet for passage of a gas therethrough, the gas including a hydrocarbon. A rotor is operatively coupled within the interior chamber, the rotor including an impingement surface and cooperating with the interior chamber to form an annular passageway about the impingement surface. The rotor is rotationally driven when the gas passes through the annular passageway. An electric generator including a core assembly is operatively coupled with at least one magnetic element, the core assembly being stationary relative to the housing and hermetically sealed within a dielectric casting for isolating the core assembly from the gas. The at least one magnetic element is secured to the rotor for rotation with respect to the core assembly.

Another embodiment may further include a framework portion having a first axial length, the framework portion including an impingement surface having a second axial length, the second axial length being is greater than one-half of the first axial length.

In another embodiment, the rotor includes a shaft portion having a standoff portion that separates two end portions, the end portions being operatively coupled with bearings. The standoff portion may have a length substantially equal to the axial length of the framework.

In yet another embodiment, the interior chamber defines a lower extremity. The outlet passage extends from the lower extremity in an orientation for draining condensation from said interior chamber.

In still another embodiment, a turbine generator for generating electricity that is powered by a flow of gas therethrough includes a housing that defines an interior chamber in fluid communication with an inlet and an outlet for passage of the gas therethrough. The gas may contain a hydrocarbon. A rotor is operatively coupled within the interior chamber, the rotor including a continuous impingement surface and cooperating with the interior chamber to form an annular passageway bounded on an inner perimeter by the continuous impingement surface. The rotor is rotationally driven when the natural gas passes tangentially through the annular passageway. The embodiment includes an assembly of armature plates having an inner radial portion and an outer radial portion, and at least one winding interlaced with the outer radial portion of the assembly of armature plates. The at least one winding has a plurality of terminations. A plurality of leads, each having a proximal portion and a distal portion, one each of the plurality of lead wires, is electrically connected to one of the plurality of terminations at the proximal portion. A dielectric casting encases the outer radial portion, the at least one winding and the proximal portions of the plurality of lead wires and hermetically seals the at least one winding and the proximal portions from contact with the natural gas.

In another embodiment, an orifice passes through the inner radial portion of the assembly of armature plates and has a front end located on the front face of the assembly of armature plates. The dielectric casting encases the front end of the orifice.

Another embodiment of the invention includes a housing that defines an interior chamber in fluid communication with an inlet and an outlet for passage of a fluid therethrough, the interior chamber having a lower extremity, the outlet passage extending from the lower extremity in an orientation for draining condensation from the interior chamber. A rotor is operatively coupled within the housing and has a continuous impingement surface. A flow restricting device is disposed between the inlet and the continuous impingement surface of the rotor, the flow restricting device directing the fluid onto the continuous impingement surface and causing the rotor to rotate about an axis. An electric generator is mounted within the interior chamber and includes a core assembly and a magnetic element. The core assembly is stationary relative the housing, and the magnetic element is secured to the rotor and rotates proximate the core assembly. The embodiment also includes means for isolating the core assembly from the fluid.

An electrical generating system is also disclosed that includes a turbine generator in fluid communication with a pressurized gas source, the pressurized gas source producing a gas flow, the gas flow including a natural gas. The turbine generator includes a stationary core assembly operatively coupled with a magnetic element that rotates relative to the stationary core assembly to produce electricity. The core assembly includes current-bearing components that are encapsulated within a dielectric casting that hermetically seals the current-bearing components from the gas flow. A throttling device may be disposed between said pressurized gas source and the turbine generator, the throttling device imposing a reduced pressure in the gas flow entering the turbine generator. A pre-heating system may be disposed between the pressurized gas source and the rotor for transferring heat to said gas flow.

In another embodiment of the invention, a method of using a natural gas turbine includes selecting a turbine generator that has a plurality of electrical outputs and an interior chamber in fluid communication with an inlet and an outlet. The interior chamber contains a stationary core assembly operatively coupled with at least one magnetic element mounted on a rotor rotatable relative to the stationary core assembly for producing electricity at the plurality of electrical outputs. The rotor in this embodiment has a continuous impingement surface. The core assembly has current-bearing components that include a plurality of windings and being at least partially encapsulated within a dielectric casting that hermetically seals the current-bearing components. The method further entails connecting the plurality of electrical outputs to an electrical load and connecting a gas supply line to the inlet, the gas supply line being in fluid communication with a pressurized gas source, the pressurized gas source including a natural gas composition. A gas return line is connected to the outlet, and a gas flow is enabled from the pressurized gas source to flow through the turbine generator, the gas impinging the continuous impingement surface and causing the rotor to rotate the at least one magnetic element relative to the core assembly and produce electricity at the plurality of electrical outputs. The method may further include operating a switch between the electrical output and the electrical load, the switch being switchable between at least a load position and a no-load position. The switch is repeatedly cycled between the load position and the no-load position according to a periodic cycle to increase the average rotational speed of the rotor.

Another method according to the present invention includes operating a plurality of switches, one each in line with one of the plurality of windings, each of the plurality of switches being switchable between one of the plurality of the electrical outputs and a plurality of resistive elements. Each of the plurality of resistive elements are operatively coupled between two of the plurality of windings, wherein switching the plurality of switches to the plurality of resistive elements causes dynamic braking of the turbine generator.

DESCRIPTION OF THE INVENTION

Figure 1A:
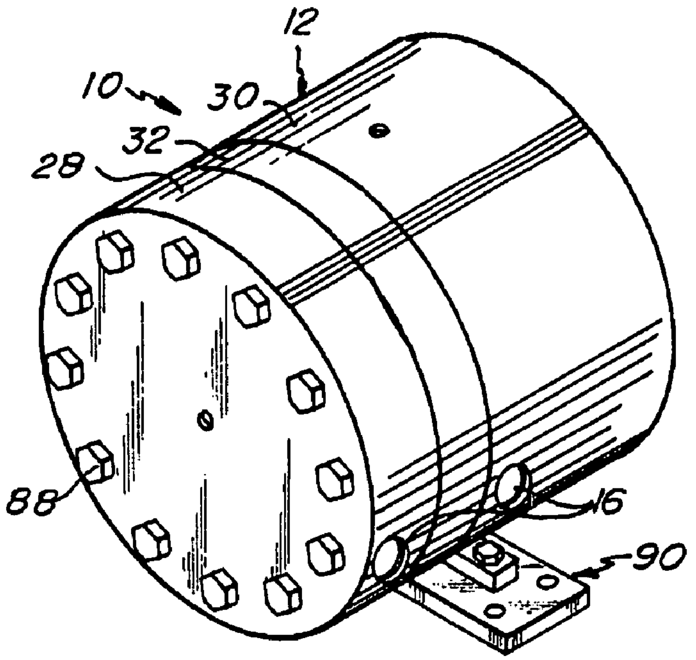
FIGS. 1*a* and 1*b* are perspective views of a turbine generator in an embodiment of the invention.
Figure 1B:
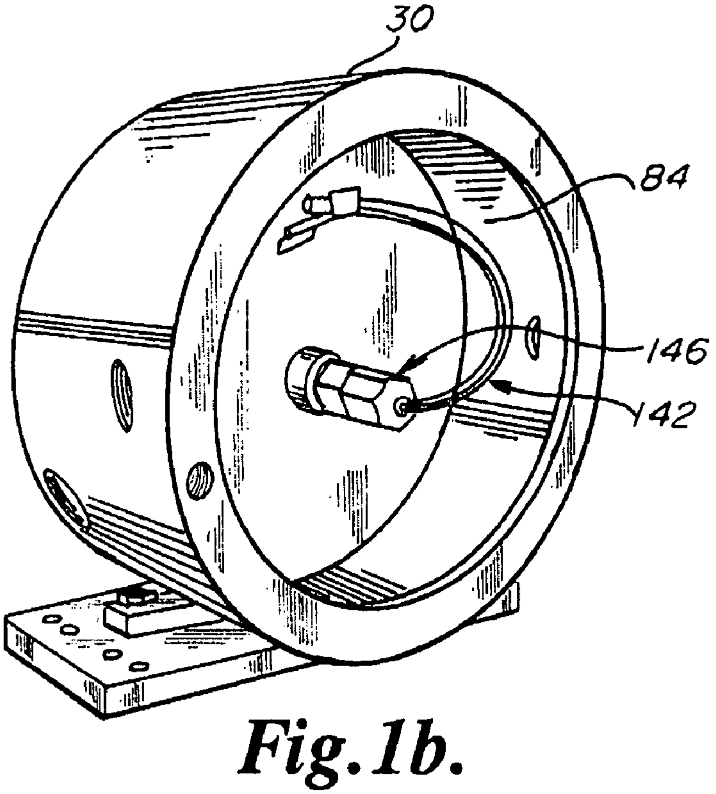
Figure 2:
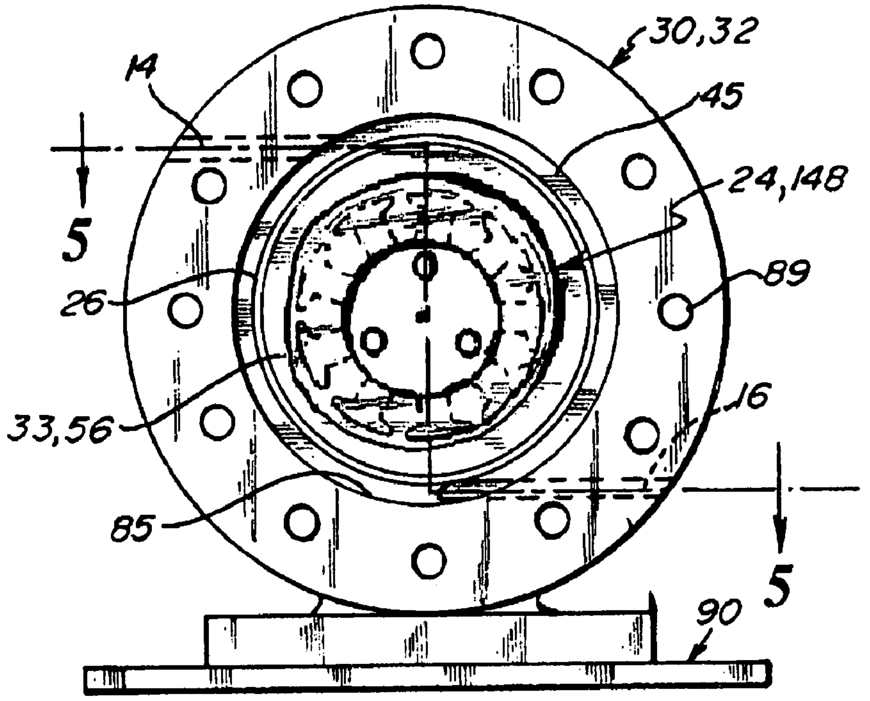
FIG. 2 is a front elevation view of the turbine generator of FIG. 1*a* with the front housing portion and the rotor removed for clarity.

Referring to the FIGS. 1 through 7, a turbine generator 10 including a housing 12 with an inlet passage 14 and a pair of fluid outlet passages 16 is depicted in an embodiment of the invention. In this embodiment, a rotor 18 having a continuous impingement surface 20 and a magnetic element 22 attached to the rotor 18 is disposed in the housing 12. The rotor 18 may be configured to substantially surround a core assembly 24. The continuous impingement surface 20 may be characterized by a roughened or structured surface such as a saw-tooth profile. A flow restricting device 26 such as a nozzle ring may be fixed in the housing 12 about the rotor 18.

The housing 12 may include a front housing portion 28 and a back housing portion 30 separated by a spacer ring 32 that combine to form an interior chamber 33 in fluid communication with the inlet passage 14 and the outlet passages 16. The front housing portion 28 includes a flange 34 in which one of the fluid outlet passages 16 may be formed. The flange 34 may also include a recess 36 for receiving an o-ring 38 and side portion of the flow restricting device 26.

The spacer ring 32 has front and back faces 40 and 42 for bearing against the front and back housing portions 28 and 30, respectively. An o-ring gland 41 for housing an o-ring 43 may be formed on the front face. The spacer ring 32 may further include the inlet passage 14 formed therein and an interior perimeter 44. A plenum or intake manifold 45 may be formed by the separation between the interior perimeter 44 and the outer peripheral surface 27 of the flow restricting device 26. A pressure regulating device (not depicted) that reduces the pressure of the incoming fluid without reducing the mass flow through the turbine generator 10 may be placed upstream of the inlet passage 14.

The front housing portion 28 may further include an annular shaped cavity 46 that defines part of the interior chamber 33. A rotor mount 48 may be formed about a central axis 49. The rotor mount 48 in this embodiment includes a pedestal portion 50 and a collar portion 52 extending from the pedestal portion 50. The collar portion 52 extends in a substantially horizontal direction from the pedestal portion 50 when the gas turbine generator 10 is in an upright (i.e. operating) position. A rotor bearing 54 is contained within the collar portion 52.

The back housing portion 30 may include an annular shaped cavity 56 about the core assembly 24 that defines a portion of the interior chamber 33 and a concentric mount 58 for the rotor 18. The concentric mount 58 in this embodiment includes a rotor bearing 60 and a shoulder 62 with threaded screw taps 64. The core assembly 24 is secured to the concentric mount 58 with socket head cap screws 66.

In the FIGS. 1 through 7 embodiment, the back housing portion 30 also includes a partition 68 and an annular wall portion 70 extending from the partition 68. The partition 68 may include the other outlet passage 16 extending from the cavity 56 to the exterior of housing 12 and a pair of annular recesses 74, 76 in which respective o-rings 78 and 80 are disposed. A front face 82 runs parallel to the back face 42 of the spacer ring 32. The annular recess 76 fixedly and sealingly receives a side portion of the flow restricting device 26, thereby exerting a compression force on o-ring 80. The annular wall portion 70 defines a large cavity or compartment 84 that may house electronic appurtenances such as buck converters, RS 485 interfaces, and assorted instrumentation.

The housing 12 may be held together by bolts 88 that pass through the front housing portion 28 and spacer ring 32 and threadably engage tapped bores 89 on the front face 82 of the partition 68 of the back housing portion 30. The housing 12 is supported by a foot structure 90 fastened to the bottom of the back housing portion 30. The passages 14 and 16 may be partially threaded with standard pipe threads.

The flow restricting device 26 may take the form of a nozzle ring that includes a plurality of apertures or jet orifices 92 for directing fluid onto the center of the continuous impingement surface 20. Typically, between fourteen and eighteen jet orifices 92 are uniformly distributed about the outer peripheral surface 27 of the nozzle ring. The number of jet orifices 92 may be changed to accommodate space and optimize torsion requirements. The structure and function of the nozzle ring and its interaction with the continuous impingement surface 20 is further described in U.S. Pat. No. 5,118,961, the disclosure of which is hereby incorporated by reference other than any express definitions of terms specifically defined therein.

Figure 4:
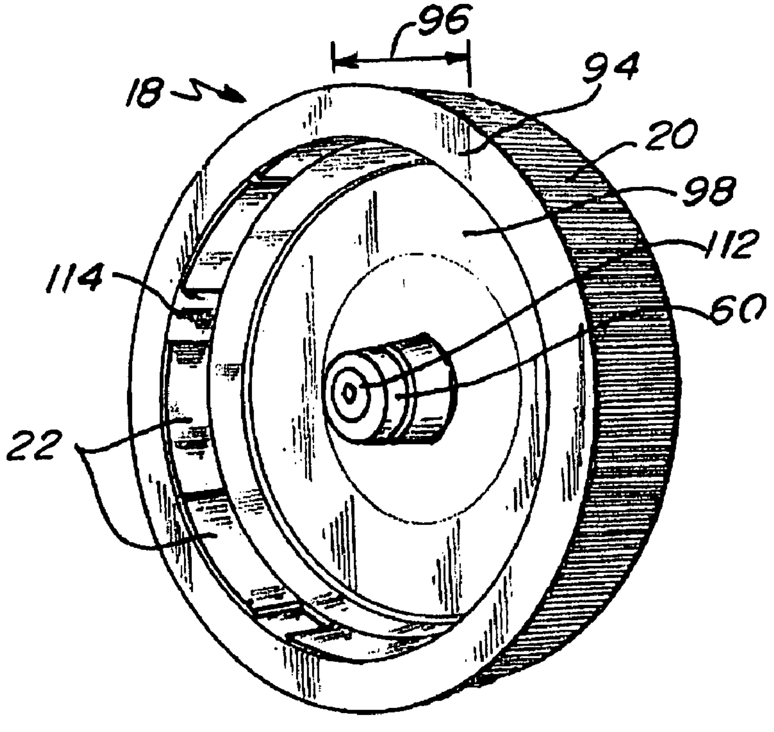
FIG. 4 is a perspective view of the rotor of FIG. 3.
Figure 3:
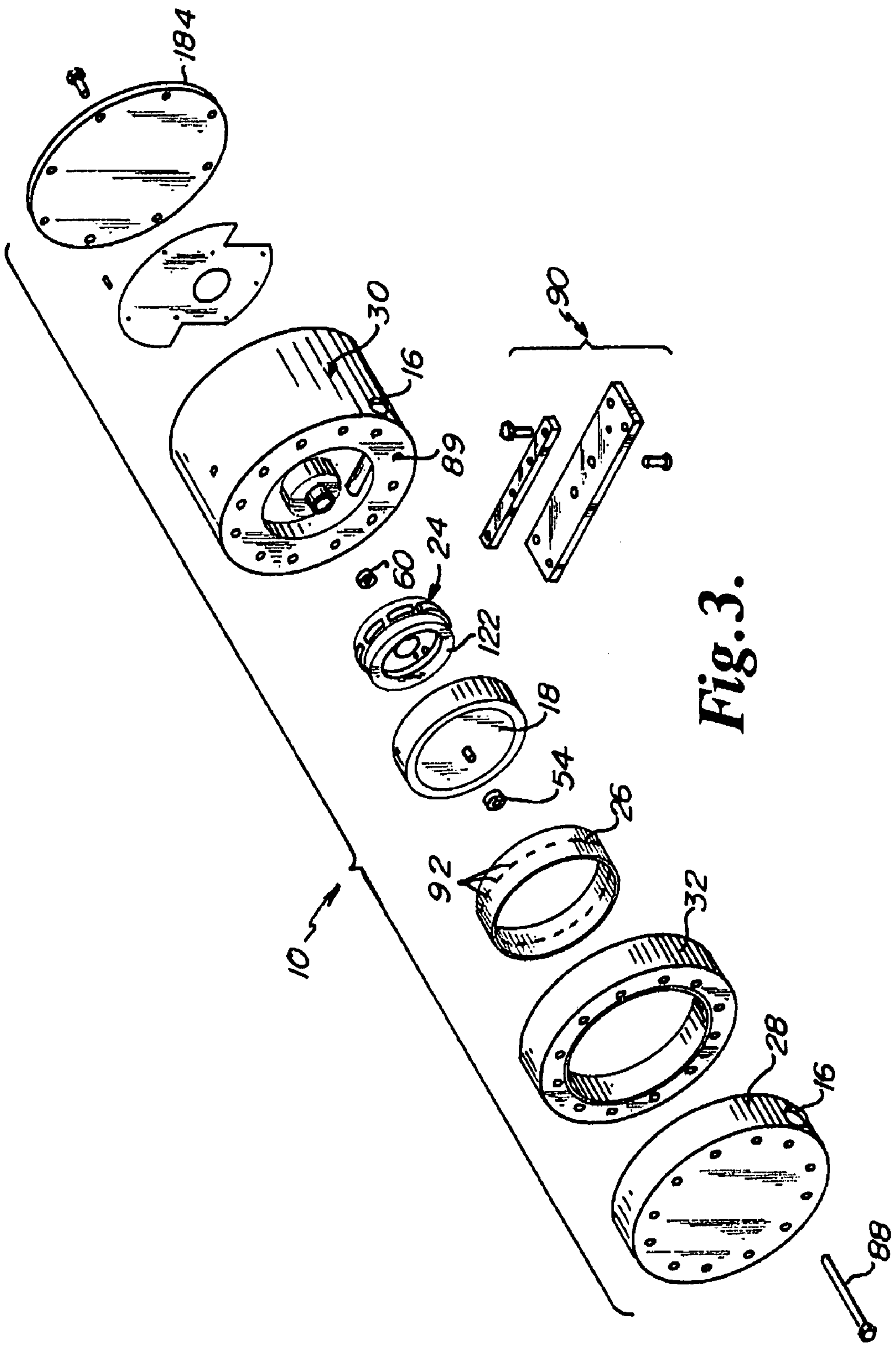
FIG. 3 is an exploded view of the turbine generator of FIG. 1*a;*

The rotor 18 (FIG. 4) may include a cylindrical side wall 94 having an axial length 96 that extends axially from the perimeter of a base portion 98, wherein the side wall 94 and base portion 98 define a receptacle or framework portion 100 that substantially covers or surrounds the core assembly 24. The base portion 98 may be disc-shaped as depicted, or of other structure suitable for supporting the side wall 94 such as a hub-and-spoke arrangement. In the depiction of FIG. 4, the framework portion 100 is further characterized as having an interior perimeter surface 102 and a base surface 104.

In one embodiment, the perimeter portion 106 of the rotor 18 is recessed to provide gaps 108 between the perimeter portion 106 and the front and back portions 28 and 30 of the housing 12. The rotor 18 further includes a rotor shaft 109 having a standoff portion 111 that separates end portions 110, 112 that mount within bearings 60, 54, respectively. The rotor shaft 109 may be integrally formed with the rotor 18.

The axial length 96 of the continuous impingement surface 20 may extend over a majority of an overall length 97 of the framework portion 100. The rotor of FIG. 8*a*, for example, depicts the axial length 96 of the continuous impingement surface 20 as almost equal to the overall length 97 of the framework portion 100; the length 96 is shorter than the overall entire length 97 only by the amount of the recess at the perimeter portion 106. Hence, in this configuration, the length 96 of the continuous impingement surface 20 is over 90% of the overall length 97 of the framework portion 100.

The interior perimeter surface 102 defines a recess 114 extending radially into the cylindrical side wall 94. The magnetic element 22 may be comprised of eight rare earth magnets disposed in pairs equally spaced at 45° from each other. Each of the magnet pairs may abut each other and have an inner peripheral surface 116 that is substantially flush with the non-recessed portion of the interior perimeter surface 102.

In certain embodiments, the core assembly 24 includes an armature plate assembly 118 comprising a plurality of laminated steel armature plates 120 (FIG. 6) configured for mounting on concentric mount 58 of back housing portion 30 via the cap screws 66. A trio of windings 122 (one for each phase of a 3-phase generator) is interlaced with an outer radial portion 124 of the armature plate assembly 118. Further details of the armature plates 120 and the configuration of the windings 122 are presented in U.S. Pat. No. 5,118,961.

Figure 11:
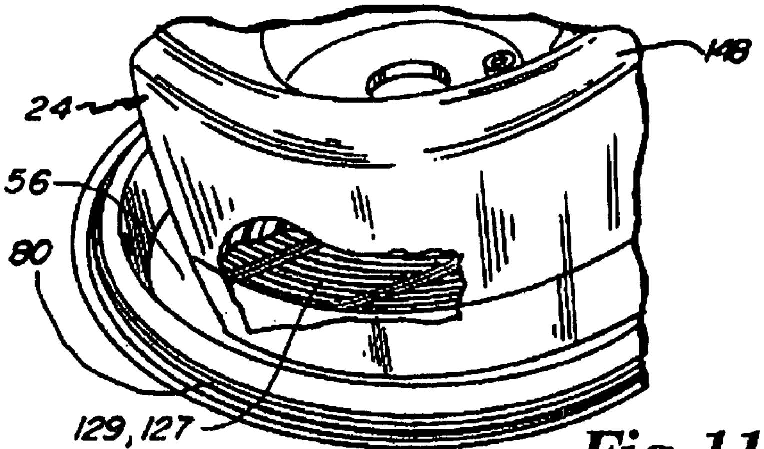
FIG. 11 is an enlarged partial view of the core assembly of FIG. 10 with a cut-away view of the plate assembly within.

The armature plate assembly 118 is characterized as having an inner radial portion 126 in addition to the outer radial portion 124 that includes a plurality of poles 125 extending radially outward and an armature interface 127 on the tangential face of the outer radial portion 124. The individual plates 120 of the armature plate assembly 118 may be angularly offset with respect to the neighboring plates to provide a trapezoidal shape 129 on the armature interface 127 of the armature plate assembly 118 (best depicted in FIG. 11).

In one embodiment, the inner radial portion 126 is further characterized as having a front face 128 and a back face 130. The back face 130 of the armature plate assembly 118 rests against the shoulder 62 of the concentric mount 58. An orifice 132 passes through the inner radial portion 126, the orifice 132 having a front end 134 that faces the framework portion 100 of the rotor 18 and a back end 136 adjacent the shoulder 62 of the concentric mount 58. The orifice 132 is aligned with a wire way passage 138 passing between the shoulder 62 and the compartment 84 of the back housing portion 30.

The windings 122 may have terminations 140 that are located within the framework portion 100 of the rotor 18, in close proximity to the front end 134 of the orifice 132. A set of three phase leads 142 having a proximal portion 143 and a distal portion 145 are connected to the terminations 140 at the ends of the proximal portion 143. The distal portion 145 is routed through the orifice 132, the wire way passage 138 and a sealed connector 146 attached to the back end 136 of the wire way passage 138. A neutral lead 144 may also be similarly routed and connected. The leads 142, 144 may be shrouded in a sleeve 147 such as a shrink fit tube, either individually or as a group. The sleeve 147 extends from the packing gland of the connector 146, through the wire way passage 138 and into the orifice 132.

Figure 8:
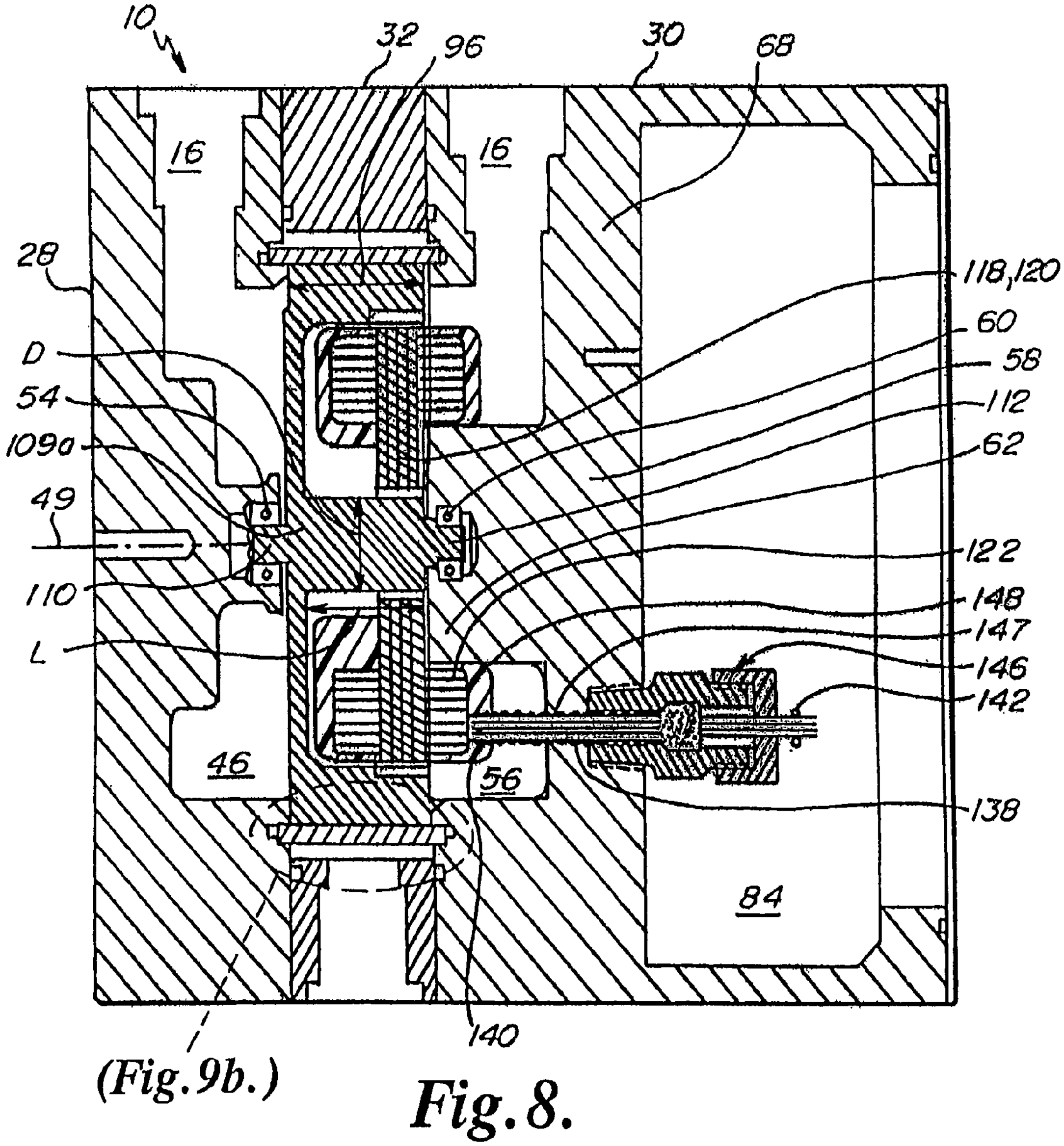
FIG. 8 is a sectional view of a turbine generator in an embodiment of the invention.

Referring to FIG. 8, the terminations 140 depend from the windings 122 into the annular cavity 56, with the wire way passage 138 being in substantial alignment with the terminations in another embodiment of the invention. The leads 142, 144 traverse the annular cavity 56 between the terminations 140 and the wire way passage 138. Again, the leads 142, 144 may be wrapped with sleeve 147 extending from the terminations 140 through the wire way 138 and through the packing gland of the connector 146. The configuration of the wiring in FIG. 8 negates the need for an orifice 132 passing through the armature plate assembly 118.

The embodiment of FIG. 8 also depicts a rotor shaft 109*a* as having a standoff portion 111 that is substantially equal to the overall length 97 of the framework portion 100 of the rotor 18. The standoff portion 111 of the rotor shaft 109*a* is characterized by a length L that is longer than the comparable portion of the rotor shaft 109 of FIG. 5. To accommodate the longer length L, the bearing 60 may be recessed within the concentric mount 58, such that the shoulder 62 extends beyond the end portion 112 of the rotor shaft 109*a*.

Figure 8A:
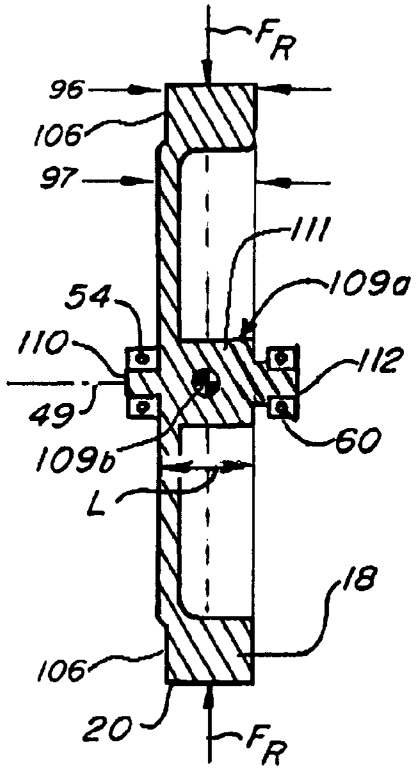
FIG. 8*a* is a sectional view of the rotor of FIG. 8 in isolation.

Functionally, the extended length L of the rotor shaft 109*a* may enhance the dynamic balance of the rotor 18, particularly at higher rotational speeds. The working fluid 149 may be directed through the flow restricting device 26 to impinge on the axial center of the continuous impingement surface 20 of the rotor 18. Referring to FIG. 8*a*, forces are generated on the rotor having a radial component directed $F_R$ inward toward the central axis 49. Any moments supported by the rotor shaft 109*a* will cause unequal loading between the bearings 54 and 60, which can manifest itself as a vibration, particularly at high rotational speeds. Also, if the radial forces $F_R$ are not uniform, the shaft may experience a net load in a direction orthogonal to the central axis 49.

The extended length L of the rotor shaft 109*a* enables the radial force components $F_R$ to intersect substantially coincident with the center 109*b* of the rotor shaft 109*a*, thereby reducing the moment supported by the rotor shaft 109*a* and promoting the uniform loading of the bearings 54 and 60. The configuration may provide dynamic stability across a range of rotational speeds.

Figure 9A:
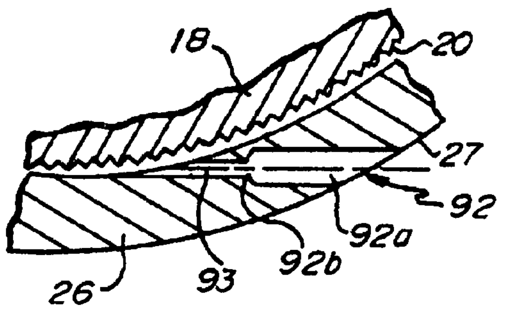
Fig. 9a. (PRIOR ART)
FIG. 9*a* is a sectional view of a nozzle arrangement for directing a jet onto the impingement surface at a substantially tangential angle of incidence.

Referring to FIG. 9*a*, each of the orifices 92 may be configured with a larger aperture portion 92*a* having a concave end and a smaller diameter aperture portion 92*b*. An axis 93 of each of the orifices 92 may be substantially tangential to the continuous impingement surface 20 of the rotor 18.

Figure 9C:
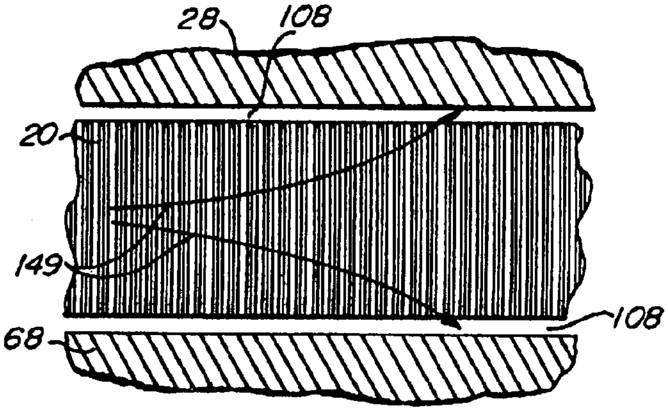
FIG. 9*c* is an enlarged partial cut-away view of the rotor of FIG. 9*b;*
Figure 9B:
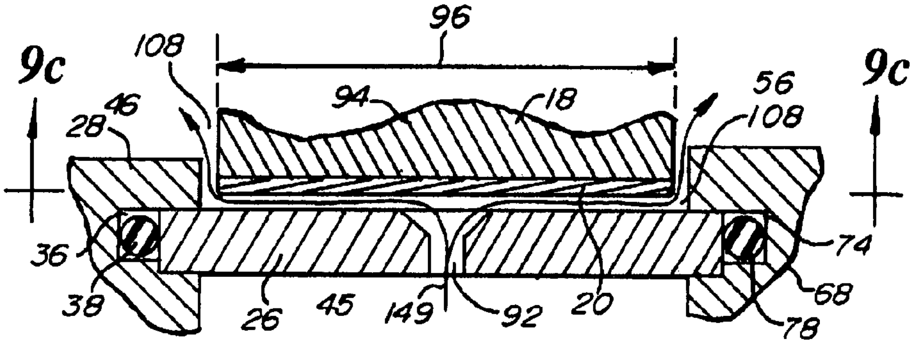
FIG. 9*b* is an enlarged partial sectional view of the rotor and nozzle ring of FIGS. 5 and 8.

Referring to FIGS. 9*b* and 9*c*, an enlarged view of the fluid flow about the cylindrical sidewall 94 of the rotor 18 is presented in an embodiment of the invention. As fluid pressure builds in the plenum 45, the working fluid 149 flows through the jet orifices 92 to tangentially impinge the continuous impingement surface 20 to rotationally drive the rotor 18. The working fluid 149 exiting the jet orifices 92 fan out over the continuous impingement surface 20 through the gaps 108 into cavities 46, 56 (FIG. 9*b*) and is conveyed by pressure out of the housing 12 through fluid outlets 16.

The continuous impingement surface 20 subtends the diverging angle of the fanning jet until the fluid pours over the edge of the continuous impingement surface 20 and into gaps 108. A wider continuous impingement surface 20 (i.e. greater axial length 96) may extract more momentum extracted out of the fluid because the working fluid 149 is in contact with continuous impingement surface 20 over a longer tangential track (FIG. 9*c*).

Accordingly, a majority of the overall length 97 of the framework portion 100 of the rotor 18 may be utilized as an impingement surface to increase the area and length over which angular momentum is imparted on the rotor 18 for the given axial length 96. The axial length 96 may exceed 90% of the overall length 97 in some embodiments. Integration of the continuous impingement surface 20 and the interior perimeter surface 102 on a common cylindrical side wall 94 provides further compactness and economization of space.

The continuous impingement surface 20 may include a roughened or structured surface. Impingement surfaces 20 that include a structured surface may possess a higher degree of aerodynamic drag than a machine finished surface, which also can extract more momentum out of the working fluid 149. For example, the continuous impingement surface 20 may have a saw-tooth profile as depicted in FIG. 9*a* across the entire axial length 96. The structure may have a peak-to-valley dimension greater than 0.17-mm. A representative and non-limiting range for the peak-to-valley dimension of the saw-tooth profile is 0.5- to 1.0-mm. An increased transfer of momentum may result in a greater rotational velocity of and/or more rotational power to the rotor 18. Other structured surfaces include knurled surfaces, hobbed or herring bone, and may have typically the same peak-to-valley dimensions.

The continuous impingement surface 20 may be characterized by a roughness parameter. A representative and non-limiting value for the surface roughness is a root-mean-square (RMS) value of 0.1-mm or greater. Accordingly, the continuous impingement surface 20 may roughened by other structural means, such as by sandblasting.

Figure 5:
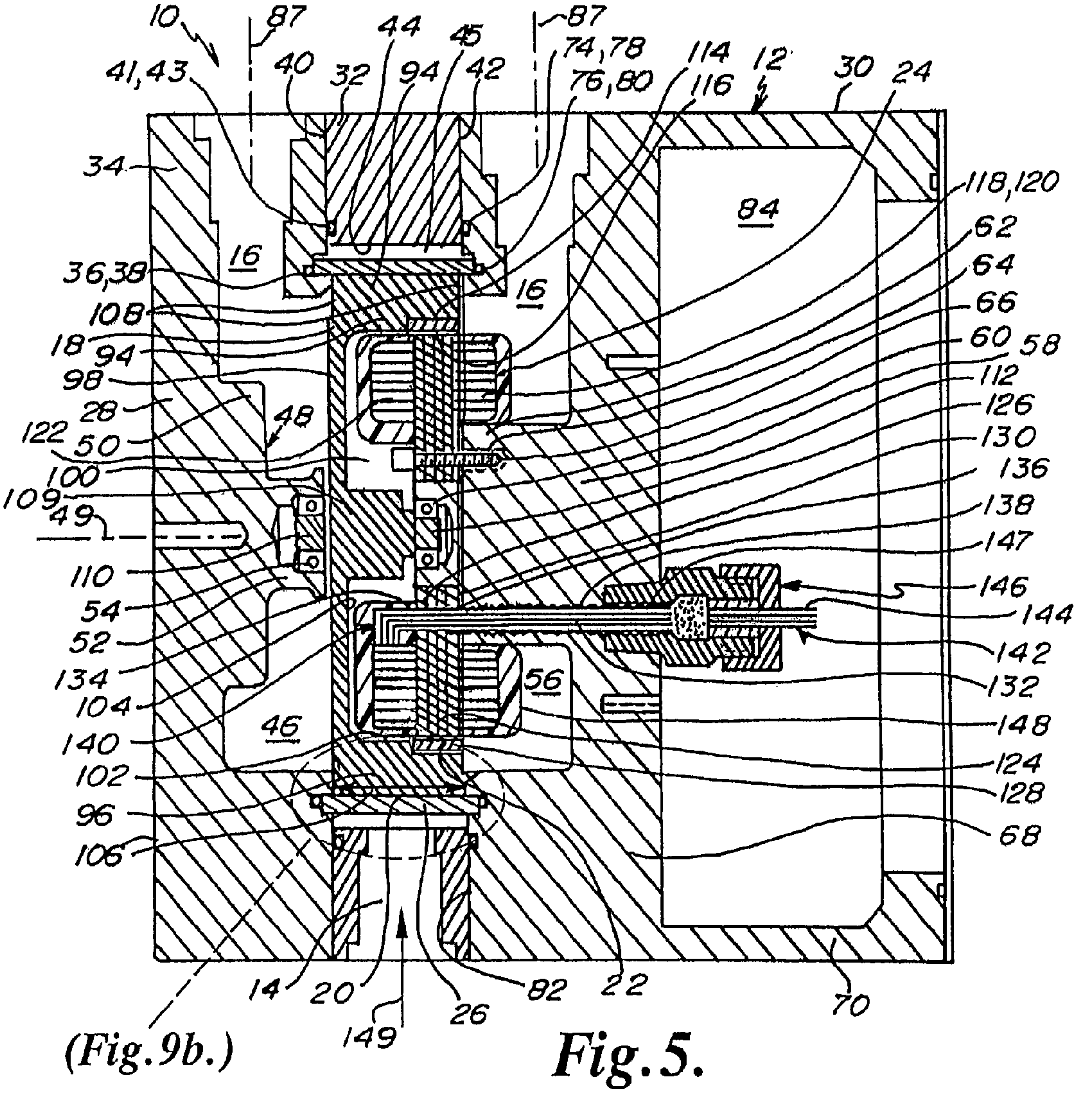
FIG. 5 is a sectional view of the turbine generator of FIG. 1*a* along the datum indicated in FIG. 2.
Figure 6:
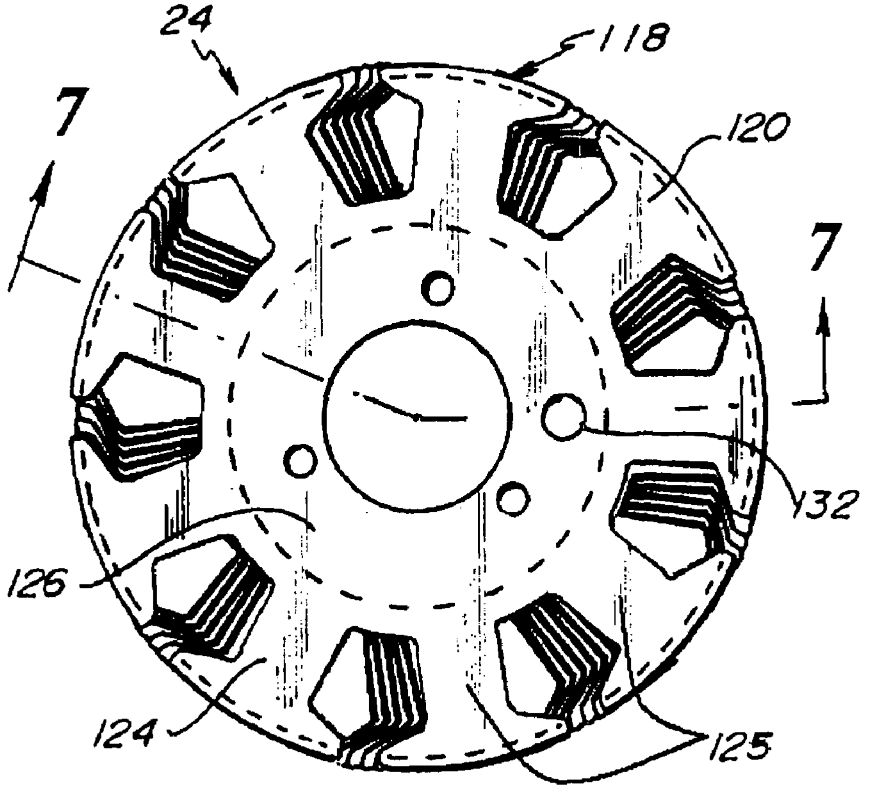
FIG. 6 is a plan view of an assembly of armature plates in an embodiment of the invention.
Figure 7:
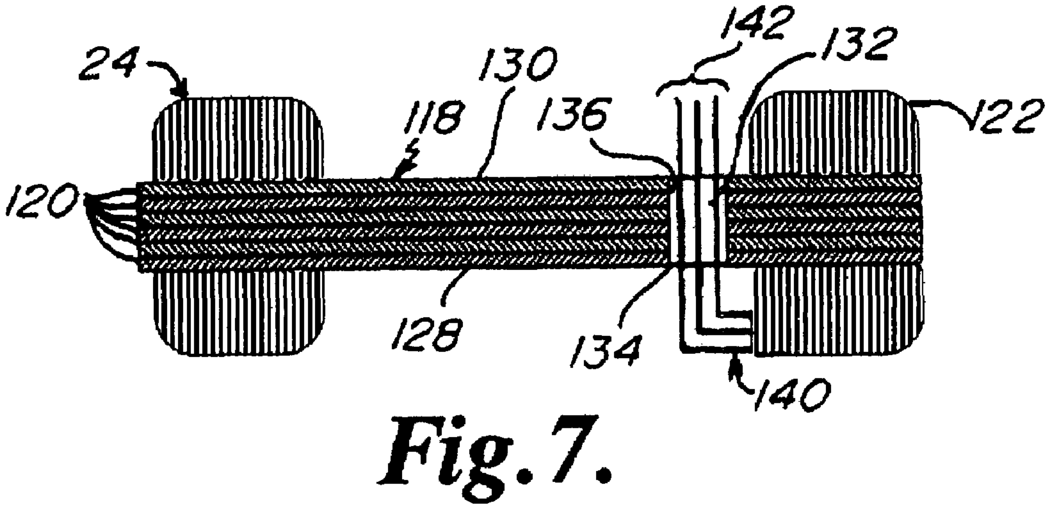
FIG. 7 is a sectional view of the assembly of armature plates of FIG. 6.
Figure 10:
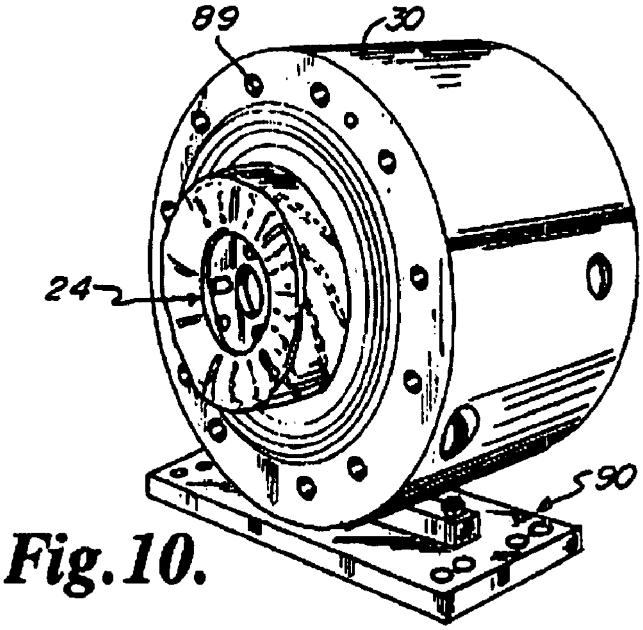
FIG. 10 is a perspective view of a core assembly secured to a back housing portion in an embodiment of the invention.
Figure 12:
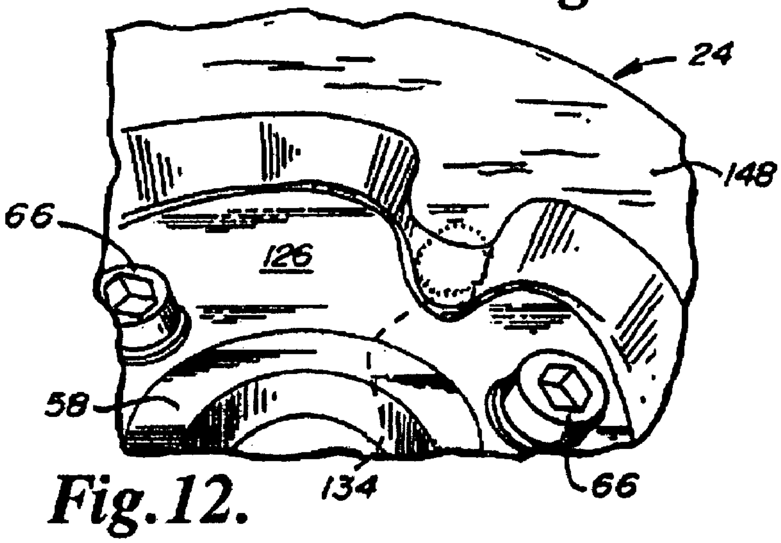
FIG. 12 is an enlarged partial view of the core assembly of FIG. 10 in the vicinity of an encased front end of an orifice for feeding through wire terminations.

Referring to FIGS. 10 through 12 and again to FIGS. 5 and 8, the core assembly 24 is depicted as being hermetically sealed in an embodiment of the invention. The outer radial portion 123, windings 122, terminations 140 and the portion of the leads 142, 144 that extend between the terminations 140 and the front end 134 of the orifice 132 are encased in a dielectric potting or dielectric casting 148. The dielectric casting 148 also floods the orifice 132 during the potting process, encasing the leads 142, 144 and an end of the sleeve 147 located within. The other end of the sleeve 147 is sealed against the leads 142, 144 by the packing gland of the connector 146. The dielectric casting 148 may be of any suitable potting having appropriate dielectric, thermal and mechanical characteristics. An example is an epoxy such as Epoxylite 230 manufactured by Altana Electrical Insulation of St. Louis Mo. Other candidates for the casting material 148 include electrical resins such as Scotchcast Electrical Resin 251 and general purpose electronic impregnation materials. Some applications may require dielectric castings suitable for elevated temperatures, for example to 200° C. Silicone-based materials may also be appropriate in some applications.

The housing 12, including the housing portions 28, 30 and spacer ring 32, as well as the foot structure 90, are typically formed of a stainless steel. Alternative materials include aluminum and plated 8620 steel. The rotor 18 is also typically formed of a stainless steel, although aluminum may be used. The nozzle ring 26 is typically fabricated from a stainless steel or anodized aluminum. The various o-rings 38, 43, 78 and 80 provide a gas tight seal between respective mating components.

In operation, a working fluid 149 such as natural gas, passes through the inlet passage 14 and through nozzle ring 26, impinging on the continuous impingement surface 20 to drive the rotor 18 and magnetic element 16 about the core assembly 24. As the rotor 18 is driven by the impinging fluid on the continuous impingement surface 20, the magnetic element 22 spins about core assembly 24 to generate electricity in a brushless fashion. Approximately 500 watts of alternating current power may be generated. Both the FIG. 5 and FIG. 8 embodiments are motivated in this manner.

The standard pipe threads in the passages 14 and 16 enable the coupling of supply and return lines to the turbine generator 10. Fluid flowing through the inlet passage 14 impinge on the outer peripheral surface 27 of the nozzle ring 26, circulates tangentially through the plenum 45 and over the jet orifices 92.

The implementation of a pressure regulating device upstream of inlet passage 14 (discussed above but not depicted) may increase the aerodynamic drag of the fluid against the continuous impingement surface 20, thereby transferring more momentum from the fluid to the rotor 18. The density ρ of an ideal gas is generally proportional to the pressure P of the gas. For a given mass flow rate mdot of the gas through a passage having a flow cross-section AC, the corresponding velocity U of the gas through the passage is derived from the relationship $$m\text{dot}=\rho\cdot U\cdot A_C$$

Thus, a reduction in the pressure P generally causes a proportional increase in the velocity U for a fixed mdot and $A_C$. The drag force D exerted on a surface is proportional to the density ρ and the square of the velocity U of the gas, that is:

$$D\propto\rho\cdot U^2$$

The tradeoff between the reduced density ρ and the increased velocity U caused by a reduction of the upstream pressure may result in an increase in the drag force D, which in turn imparts more momentum from the gas to the rotor 18. An increase in the drag force D results in a more powerful rotation of the rotor 18 and a higher rotational speed. Therefore, where head losses permit, regulation of the pressure to the inlet to a lower pressure without an attendant reduction in mass flow rate should result in enhanced performance of the turbine generator 10.

The use of anodized aluminum for a nozzle ring 26 provides a surface that is softer than a stainless steel rotor 18, thus minimizing damage to the continuous impingement surface 20 of the rotor in the event that the rotor 18 contacts the nozzle ring 26 during operation.

The extension of the collar portion 52 helps prevent moisture from entering the rotor bearing 54. If the rotor bearing 54 were mounted flush with the pedestal portion 50, condensation forming on the face of the pedestal portion 50 could run down and into the rotor bearing 54. The extension provided by the collar portion 52 causes accumulated condensation on the face of the pedestal portion 50 to flow around the collar portion 52, preventing the condensation from entering the rotor bearing 54.

The dielectric casting 148, in combination with the sleeve 147, hermetically seals all current-bearing components that would otherwise come in contact with the flowing fluid. In particular, the connections between the terminations 140 and the leads 142, 144, which may otherwise be in direct contact with the flowing gas, are well isolated by the disclosed potting scheme. The isolation provided by the dielectric casting 148 prevents arcing between the connections and the accompanying damage and reliability problems that arcing poses. Embodiments utilizing the dielectric casting 148 eliminate the formation of carbon build up on the leads due to arcing, and are also deemed explosion proof for natural gas or other hydrocarbon gas applications.

The sleeve 147, whether applied to individual leads 142, 144 or to the group, is sealed on one end by the potting material 148 and on the other by the packing gland in the connector 146. Accordingly, it is possible to affect the isolation of the leads 142, 144 from fluid of the turbine generator 10 by other means that encase the wire, such as a rubber or silicone dip that coats the wires along an equivalent portion.

The trapezoidal shape 129 of the armature interface 127 of FIG. 9 promotes smooth revolution of the rotor 18 at low rotational rates. For generators utilizing magnetic elements 22 and armature interfaces 127 that are rectangular in shape, the rotor 18 may jump from one equilibrium position to another as the magnetic elements 22 cross between segments of the armature interface 127. This phenomenon, known as "cogging," is mitigated by the trapezoidal shape 129 because the trapezoid provides a bridging between the armature interface 127 and the discrete, rectangularly-shaped magnetic elements 22.

Figure 13:
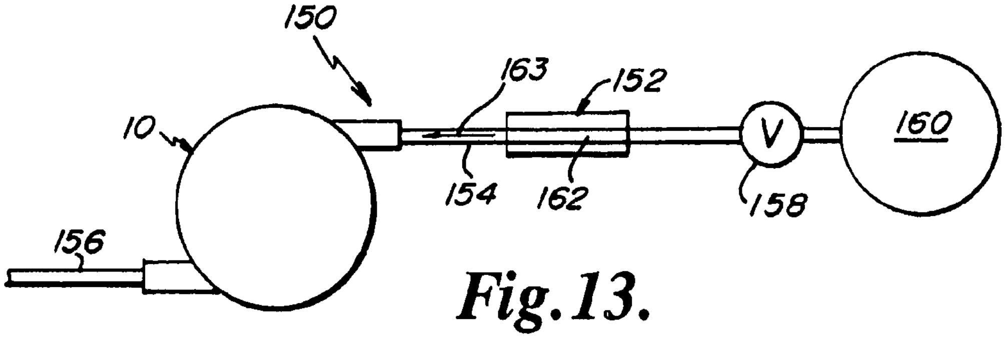
FIG. 13 is a schematic of a turbine generator system in an embodiment of the invention.

Referring to FIG. 13, a generator system 150 including the turbine generator 10 and a gas pre-heater 152 is depicted in an embodiment of the invention. The generator system 150 may further include a gas supply line 154, a gas return line 156 and a throttling device 158 located between the gas supply line 154 and a pressurized gas source 160. In the embodiment depicted, the pre-heater 152 may apply energy to a heated segment 162 of the gas supply line 154 for transfer to an incoming gas stream 163. In other embodiments, the pre-heater 152 may be mounted within the gas supply line 154 to impart energy directly to the incoming gas stream 163. Hence, energy delivered to the heated segment 162 may be applied externally and transferred through the walls of the gas supply line 154, or applied internally, within the boundaries of the gas supply line 154.

The energy source for the pre-heater 152 may comprise any of several heat sources, including but not limited to a heating element such as heat tape operatively coupled to the heated segment 162, or a heat exchanger operatively coupled to the heated segment 162 which draws heat from an ancillary process. Other mechanisms that can be utilized to introduce energy into the incoming gas stream 163 include a slip stream used to introduce a hot gas into the incoming gas stream. A controlled vitiation process wherein a fraction of the incoming gas is combusted may also be implemented to add heat. Furthermore, several heat source mechanisms may be combined to provide the pre-heating function at various times, depending on availability.

In practice, the throttling device 158 may be utilized to reduce the pressure of the pressurized gas source 160 upstream of the turbine generator 10. The throttling process may cause expansion of the gas across the throttling device 158, reducing the temperature of the gas. The reduced temperature of the gas limits the expansion of the gas as it enters the turbine generator. The density ρ of the gas increases, but as previously discussed, the increased density ρ will proportionately reduce the velocity U of the gas as it flows across the rotor 18 resulting in a net loss to the drag force D that motivates the rotor 18.

A similar reduction in temperature may also occur as the gas passes through the nozzle ring 26. Depending on the magnitude of the combined step down in pressure, the temperature reduction may be enough to degrade the performance of the generator system 150 to a level that does not meet specification.

The pre-heater 152 may restore at least partially the temperature of the gas and bring the generator system 150 to within performance specifications. The power or energy imparted by the pre-heater 152 may be a predetermined value, or adjustable to enable trimming, such as in a feedback control scheme.

The skilled artisan will recognize that the energy addition may be made anywhere upstream of the turbine generator 10 and, aside from non-adiabatic losses, still counter the temperature losses associated with the expansion across the throttling device 158.

Figure 14:
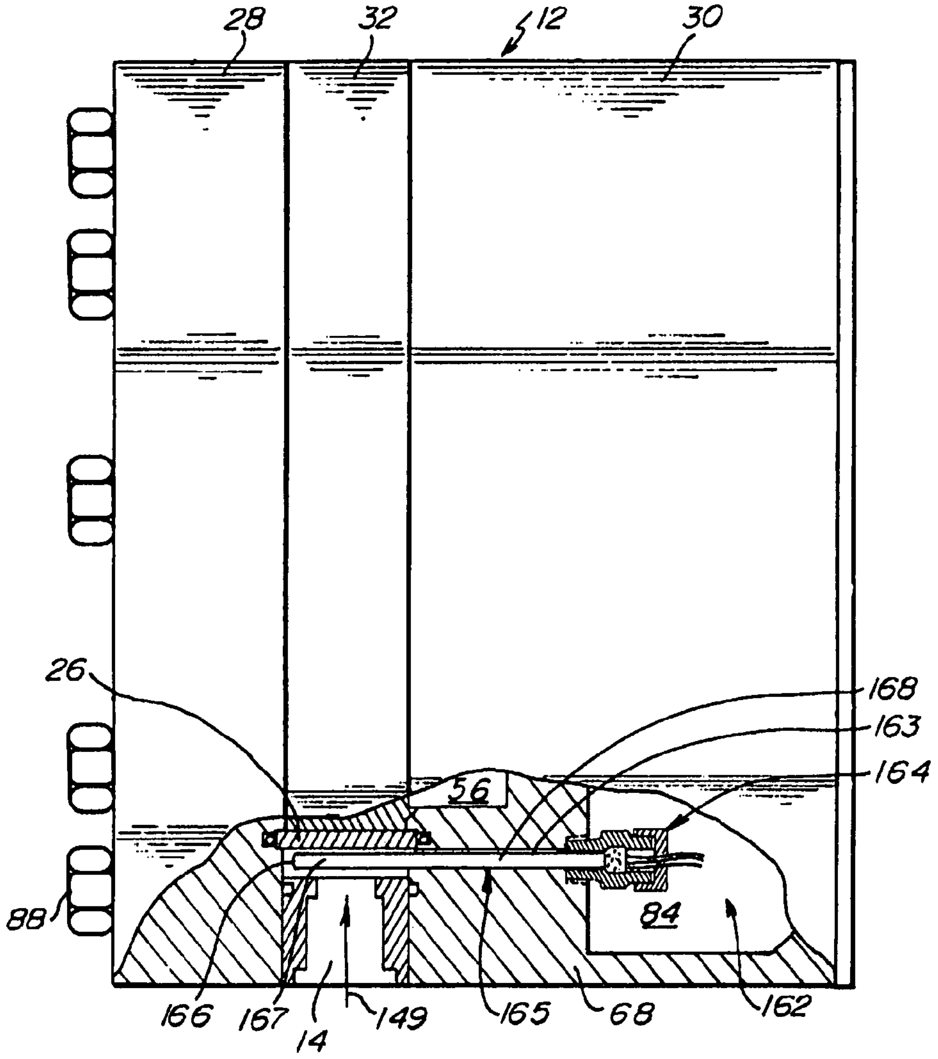
FIG. 14 is a cut-away view of a turbine generator depicting the use of heating elements in a plenum of the turbine generator in an embodiment of the invention.

Referring to FIG. 14, an alternative heating arrangement 162 for providing the pre-heating function internal to the natural gas turbine 10 is depicted in an embodiment of the invention. A plurality of passages 163 may be formed in the partition 68 to penetrate the plenum 45. Each of the passages may be capped on the end opposite the plenum 45 with a feedthrough 164 such as a compression fitting. Only one such passage 163 and feedthrough 164 is depicted in FIG. 14 and is discussed herein. A heating element 165 such as a cartridge heater may be fed through the feedthrough 164 and passage 163 so that a distal end 166 extends into the plenum 45. The heating element 165 may comprise a heated portion 167 near the distal end 165, an unheated portion 168 adjacent the partition 68, and lead wires 169 that may be terminated within the compartment 84.

In operation, the working fluid 149 enters the inlet 14 and courses through the plenum 45 before passing through the nozzle ring 26. Heat is transferred to the working fluid 149 as it passes over the heated portion 167 of the heating element 165, thereby raising the temperature and providing the preheating function prior to passage through the nozzle ring 26. The feedthrough 164 provides a gas-tight seal about the passage 163 and the heating element 165, thereby preserving the integrity and explosion-proof rating criteria of the compartment 84.

The unheated portion 168, which resides in the passage 163, may be tailored for a substantially lower watt density than the heated portion 167. One reason for including an unheated portion 168 is because the unheated portion 168 of the heater 165 is in a region of stagnant flow, and may not be adequately cooled if the unheated portion 168 were subject to the same watt density as the heated portion 167. An untailored heating element (i.e. one with a uniform watt density across its entire length) may fail because of overheating of the portion within the passage 163, or the untailored heating element may have to be operated at a reduced capacity to prevent such failure, thereby delivering inadequate heat to the working fluid Another reason to configure the heating element 165 with an unheated portion 168 is to limit unnecessary heating of the partition 68 and preserve the cooling capabilities that the partition 68 provides, which is described below.

Figure 15:
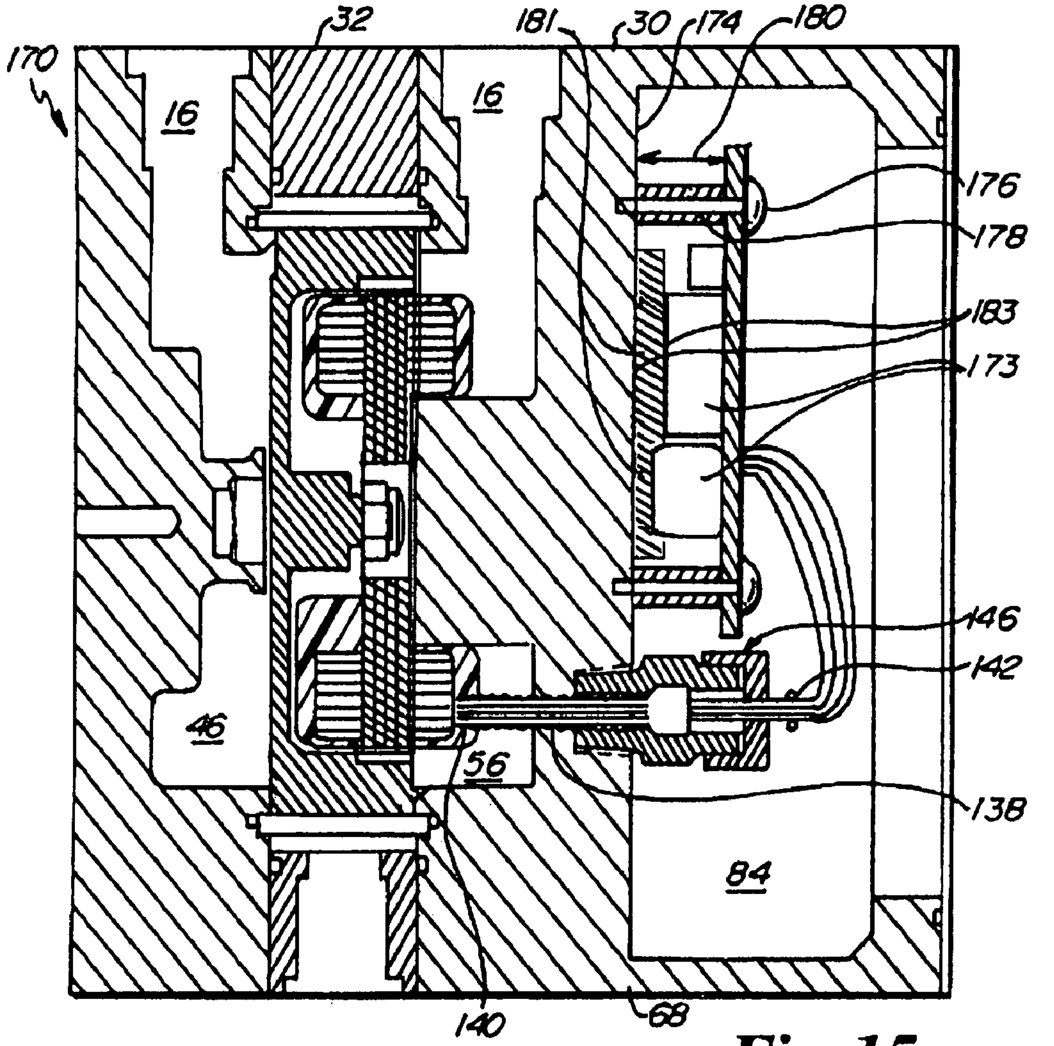
FIG. 15 is a sectional view of a turbine generator with a control board mounted therein in an embodiment of the invention.
Figure 16A:
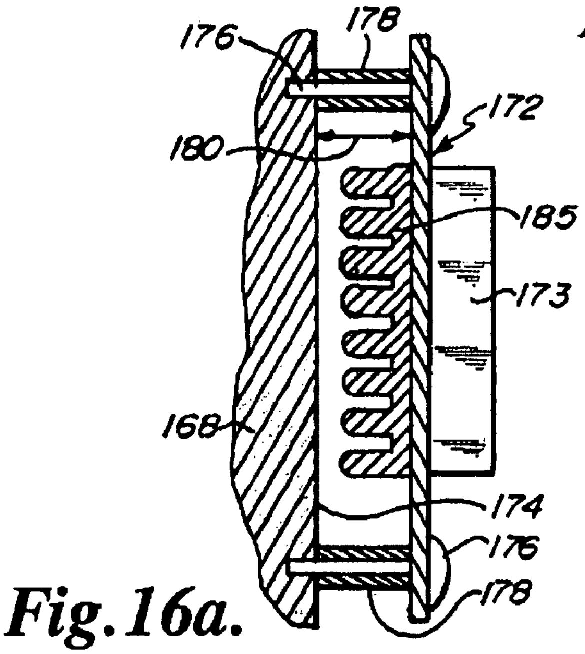
FIG. 16*a* is a sectional view of the control board of FIG. 16 having finned elements for convective heat transfer in an embodiment of the invention.
Figure 16:
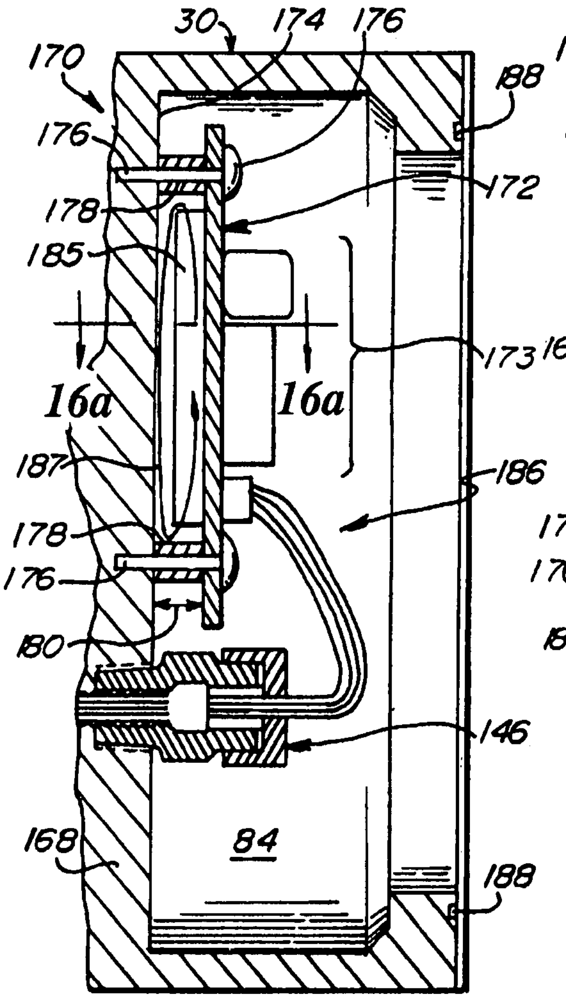
FIG. 16 is a partial sectional view of a turbine generator with a control board that is convectively cooled in an embodiment of the invention.
Figure 17:
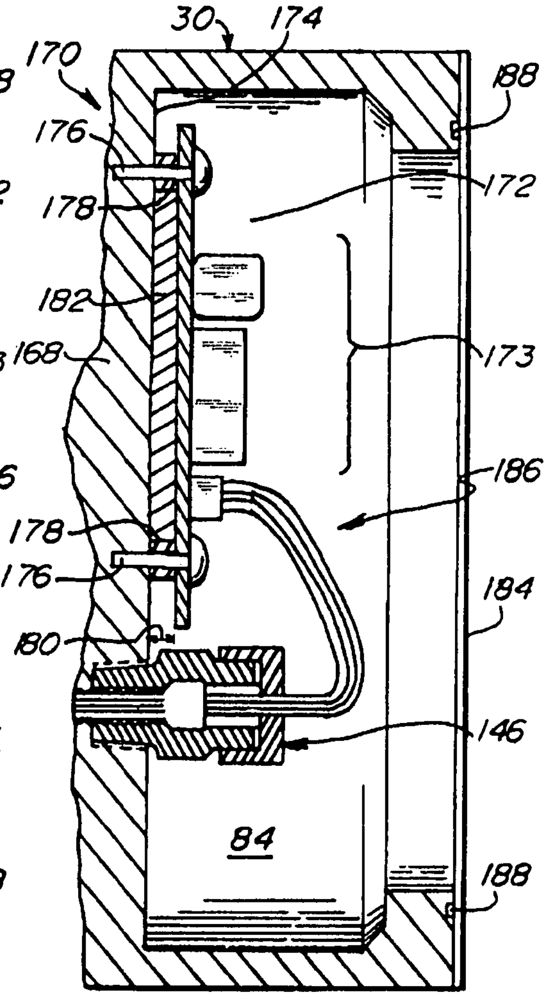
FIG. 17 is a partial sectional view of a turbine generator with a control board that is conductively cooled in an embodiment of the invention.

Referring to FIGS. 15 through 17, various embodiments of a turbine generator 170 are depicted as including a control board 172. The control board 172 may include heat-generating components 173 for operations such as switching or power relay or other control and monitoring functions, including but not limited to buck converters, silicon-controlled rectifiers (SCRs), RS 485 interfaces, and assorted instrumentation to control or condition the electrical output and/or operation of the turbine generator 170.

In the embodiments of FIG. 15, the control board 172 is mounted on a back surface 174 of the partition 68 of the back housing portion 30, within compartment 84, using fasteners 176 and spacers 178. The spacers 178 may provide a gap 180. The gap 180 may be bridged between selected heat-generating components 173 and the back surface 174 with heat conducting bridges 181 comprising a heat conducting medium such as aluminum or copper. The heat conducting bridges may be formed on a single plate that is coupled to the back surface 174, with varying thickness to accommodate varying heights of the heat-generating components relative to the control board 172. Individual heat conducting bridges 181 attached to individual heat generating components 173 may also be used. A heat conductive paste 183 may be disposed between the heat conducting bridges 181 and the back surface 174 and heat-generating components 173, respectively.

In other embodiments, the gap 180 that may be left open (FIG. 16) or may be filled with an interstitial material 182 (FIG. 17). The interstitial material 182 may be in the form of a bonding or cement that provides intimate contact with both the control board 172 and the back surface 174. The interstitial material 182 may possess dielectric properties as appropriate to prevent shorting between the heat-generating components 173 or other components of the control board 172, as well as electrical isolation between these components and the back surface 174. In certain embodiments, the open gap 180 may include a finned structure 185 coupled to the board 172 (FIG. 16*a*).

A cover or lid 184 may be placed over the back housing to form a enclosure 186 with compartment 84. A seal 188 such as a gasket or o-ring may be secured between the lid 184 and the back housing portion 30 to form a substantially air tight enclosure 186.

In operation, a byproduct of the control board 172 may be a substantial amount of heat generation within the various heat-generating components 173. Certain embodiments of the present invention provide a synergistic way to cool the heat-generating components 173. As discussed above, gas entering the turbine generator 170 undergoes an expansion, potentially at the nozzle ring 26 as well as upstream such as with throttling device 158 (FIG. 13). The gas is in intimate contact with the partition 68 as it courses through the annular cavity 56 and the outlet passages 16, and may cause the partition 68 to operate at a temperature significantly below ambient temperatures.

The partition 68 may thereby act to cool the heat-generating components 173, via conductive coupling (FIGS. 15 and 17) or convective coupling (FIGS. 16 and 16*a*) to the back surface 174 of the partition 68. The heat conductive paste 183, when utilized, enhances the conductive heat transfer by reducing the contact resistance between the heat conducting bridges 181 and the back surface 174 and heat-generating components 173, respectively (e.g. FIG. 15).

In FIG. 16, a natural convection loop 187 may be established and driven between the cool back surface 174 and the opposing face of the warmer control board 172. When utilized, the finned structure 185 (FIG. 16*a*) enhances the effect of convective cooling by increasing the effective heat transfer area. Fins may also be formed or disposed on the back surface 174 (not depicted) to further enhance the heat exchange between the heat-generating components 173 and the partition 68.

Radiative heat transfer to the back surface 174 of the partition 68 is also generally present, and may be enhanced by providing a coating of high emissivity on either the back surface 174 or the surfaces adjacent the back surface 174 (e.g. the heat emitting components 173 of FIG. 15 or the control board 172 of FIG. 16, or the finned structure 185 of FIG. 16*a*) to further enhance the cooling of the heat emitting components 173. The finned structure 185, as well as any fins formed or disposed on the back surface 174, may further enhance the radiative coupling by increasing the apparent emissivity of the radiative surface.

In certain embodiments of FIG. 17, the interstitial material 182 may provide sufficient bonding between the control board 172 and the back surface 174 of the partition 68 to forego the use of fasteners. The dielectric requirements of the interstitial material 182 may manifest a lower thermal conductivity than the highly conductive materials available for the heat conducting bridges 181, the combination of a larger surface area and a smaller dimension for the gap 180 may still provide sufficient cooling of the heat conducting components 173.

By virtue of such cooling mechanisms being provided by the expanded gas in contact with the partition 68, the compartment 84 may still be maintained as the enclosure 186 without encountering excessive temperatures therein. The capability of maintaining the enclosure 186 enables the gas turbine generator 170 to retain certain safety ratings, such as a Class 1, Division 1 or Division 2 certification from Underwriters Laboratories or equivalent.

Figure 18:
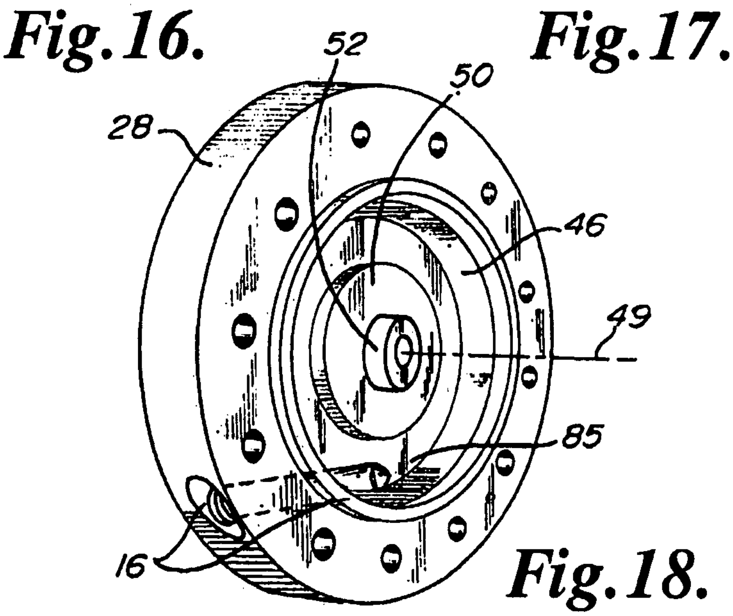
FIG. 18 is a perspective view of a front housing of a turbine generator in an embodiment of the invention.
Figure 19:
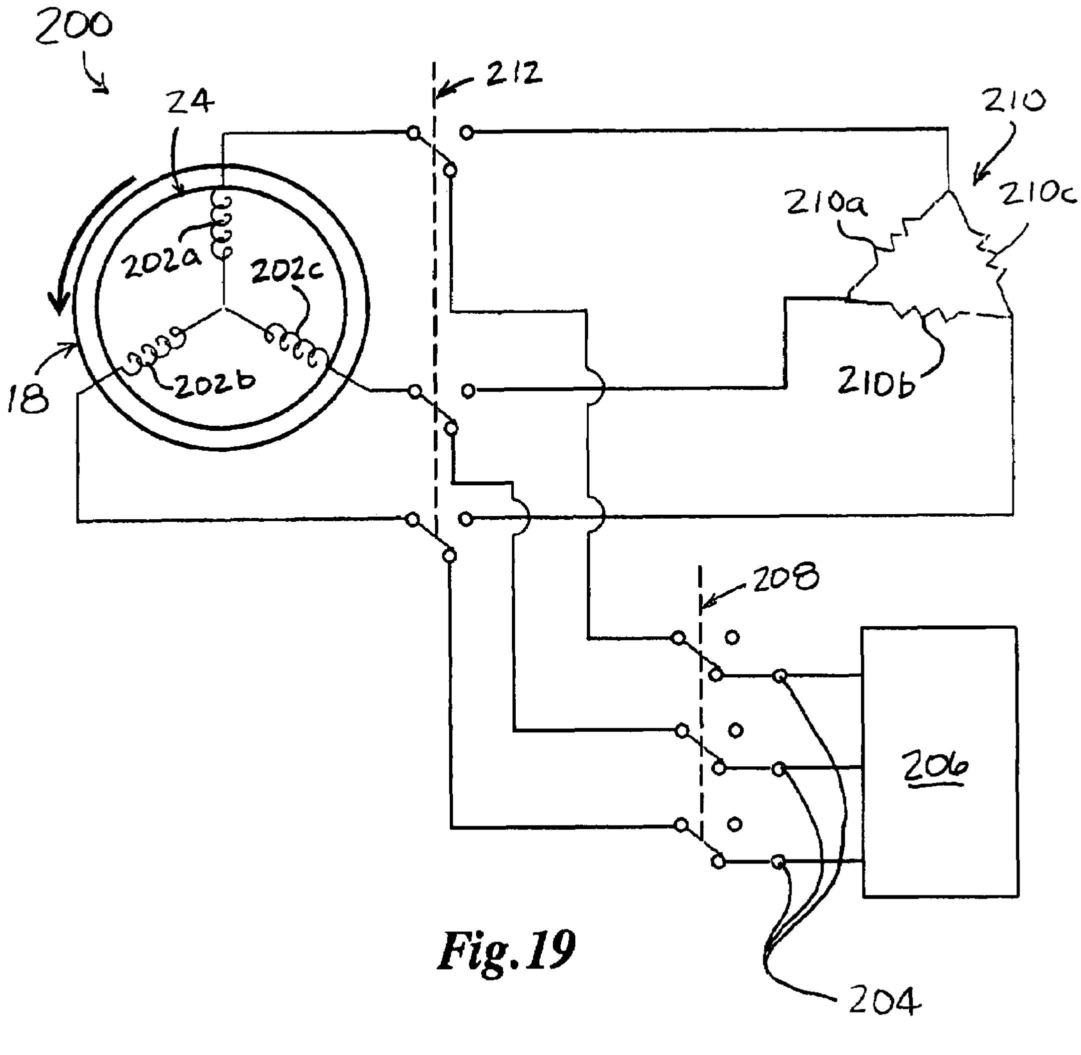
FIG. 19 is an electrical schematic of an operating circuit in accordance with an embodiment of the invention.

Referring to FIG. 18, the front housing portion 28 is depicted in an embodiment of the invention. When the gas turbine 10 is in an upright (i.e. operational) position, the central axis 49 of the gas turbine 10 is in a horizontal orientation, thereby defining a lower extremity 85 for each of the annular cavities 46 and 56, respectively. The outlet passages 16 are formed along axes 87 that are substantially horizontal when the gas turbine generator 10 is in an upright position, as depicted in FIG. 19. The outlet passages 16 penetrate the annular cavities 46 and 56 near their respective lower extremities 85.

Functionally, the orientation of the outlet passages 16 enable active purging of condensates from the gas turbine 10. Another potential consequence of the expansion of the working fluid 149 (discussed above) is the formation of condensation as the working fluid 149 cools. The location and horizontal orientation of the outlet passages 16 enable condensation to be cleared from the unit as a matter of course. Condensation that flows to the lower extremities 85 is propelled out of the annular cavities 46 and 56 and through the passages by the flowing gas. Even where flow rates or pressure differentials are marginal, the configuration enables condensate to drain hydrostatically out of the outlet passages 16.

Referring to FIG. 19, an electrical schematic of an operating circuit 200 of a turbine generator is depicted in an embodiment of the invention. A trio of windings 202*a*, 202*b* and 202*c* contained within the core assembly 24 are connected in a 3-phase wye configuration and terminating at a plurality of electrical outputs 204. The operating circuit 200 is depicted as powering a load 206. The load 206 may be any device that can operate off the power provided by the turbine generator, with or without attendant conditioning circuitry. Examples include a battery, a lamp, a video camera or a three-phase motor.

The operating circuit 200 may include a multi-pole switch 208 that alternates between a load position (depicted) and a no-load position. The multi-pole switch 208 may be cycled between the load and the no-load position.

Functionally, cycling multi-pole switch 208 between the load and no-load positions may increase the average speed of the rotor 18. When current is flowing through the windings (i.e. multi-pole switch 208 is in the load position), the rotor 18 experiences a torque load or resistance to rotational movement due to the electromotive force that is generated. When current is absent (i.e. the multi-pole switch 208 is in the no-load position), the rotor 18 rotates more freely in the absence of the electromotive force. Switching multi-pole switch 208 between the load and no-load positions cyclically allows the rotor 18 to speed up during the off cycle and gather additional angular momentum which in turn produces more electromotive force during initial stages of the on cycle immediately following the off cycle. The on/off duty of the cycle may be tailored to produce a desired average operating speed of the turbine generator 10. A range of on-duty cycles from 70% to 95% is exemplary, but not limiting. For example, the on/off duty cycle may comprise approximately 60-sec. of on duty and approximately 10-sec. of off duty.

The operating circuit 200 may also include a resistive load 210, depicted by the resistive elements 210*a*, 210*b* and 210*c* configured in a delta configuration. The windings 202*a*-202*c* may be connected to the resistive load 210 through a multi-pole switch 212 that switches current away from the load 206 to the resistive elements 210*a*-210*c*.

Functionally, switching to the resistive load 210 may be tailored to increase the torque load experienced by the rotor 18, thereby causing the resistive load 210 to function as a dynamic brake. The torque load is a function of the current generated, which in turn is a function of the rotational speed of the rotor; hence the functional description "dynamic brake." The resistive load 210 may be tailored to optimize the braking torque load.

Alternatively, the multi-pole switch 212 may be directed to a shorting bridge (not depicted). The shorting bridge may be affected by replacing resistive elements 210*a* and 210*b* with an electrical short and leaving the connections to resistive element 210*c* open.

In yet another alternative, the multi-pole switch 212 may divert current to a battery for charging (not depicted). The load imposed by the battery may also affect dynamic braking.

In either configuration (resistive load 210 or a short bridge or charging battery), current through the windings may increase compared to normal loads, thereby increasing the joule heating effect in the windings. Certain embodiments can tolerate this effect by virtue of the core 24 being immersed in the cooling flow of the working fluid 149. Accordingly, the resistive elements 210*a*-210*c* or shorting bridge elements may be encased within the dielectric casting 148 to provide cooling of these elements. Alternatively, the resistive elements 210*a*-210*c* or shorting bridge elements may be contained within the enclosure 186 and coupled to the back surface 174 of the partition 68 for the transfer of heat in a manner similar to that described in connection with FIGS. 15 through 17.

The invention may be embodied in other specific and unmentioned forms, apparent to the skilled artisan, without departing from the spirit or essential attributes thereof, and it is therefore asserted that the foregoing embodiments are in all respects illustrative and not to be construed as limiting.

References to relative terms such as upper and lower, front and back, left and right, or the like, are intended for convenience of description and are not contemplated to limit the present invention, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved systems and methods for making and using the same. Therefore, combinations of features and methods disclosed herein may not be necessary to practice the invention in its broadest sense and are instead disclosed merely to particularly describe representative and preferred embodiments of the instant invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A natural gas turbine generator comprising:

a housing that defines an interior chamber in fluid communication with an inlet and an outlet for passage of a gas therethrough, said gas comprising a hydrocarbon;

a rotor operatively coupled within said interior chamber, said rotor including an impingement surface and cooperating with said interior chamber to form an annular passageway about said impingement surface, said rotor being rotationally driven when said gas passes through said annular passageway; and a core assembly operatively coupled with at least one magnetic element, said core assembly being stationary relative to said housing and including a plurality of armature plates and a winding, said armature plates defining an outer radial portion, a front face, a back face and an orifice passing from said front face through said back face, said orifice including one of said winding and a lead passing therethrough, said outer radial portion of said plurality of armature plates, said winding and said orifice at said front face of said armature plates being hermetically sealed within a unitary dielectric casting for isolation from said gas, said at least one magnetic element being secured to said rotor for rotation with respect to said core assembly.

2. The natural gas turbine of claim 1 wherein said rotor includes a framework portion comprising a cylindrical side wall extending axially from a base, said framework portion having an overall axial length, said framework portion including an impingement surface having an axial length that is greater than one-half of said overall axial length.

3. The natural gas turbine of claim 2 wherein said axial length of said impingement surface is greater than 90% of said overall axial length.

4. The natural gas turbine of claim 2 wherein said rotor includes a shaft portion, said shaft portion including a standoff portion that separates two end portions, said end portions being operatively coupled with bearings, said standoff portion having a length substantially equal to said overall axial length.

5. The natural gas turbine of claim 2 wherein said core assembly defines an armature interface on a tangential face of said core assembly, and wherein said at least one magnetic element is secured to said rotor for rotation about said tangential face.

6. The natural gas turbine of claim 2 wherein said interior chamber defines a lower extremity and said outlet said outlet passage extends from said lower extremity in an orientation for draining condensation from said interior chamber.

7. A turbine generator comprising:

a housing that defines an interior chamber in fluid communication with an inlet passage and an outlet passage for passage of a fluid therethrough, said interior chamber having a lower extremity, said outlet passage extending tangentially from said lower extremity in a substantially horizontal orientation for draining condensation from said interior chamber;

a rotor operatively coupled within said housing and having a continuous impingement surface;

a flow restricting device disposed between said inlet and said continuous impingement surface of said rotor, said flow restricting device directing said fluid onto said continuous impingement surface and causing said rotor to rotate about an axis;

an electric generator mounted within said interior chamber, said electric generator including a core assembly and a magnetic element, said core assembly being stationary relative said housing and said magnetic element being secured to said rotor and rotating proximate said core assembly; and means for isolating said core assembly from said fluid.

* * * * *